United States Patent
Zhu et al.

(10) Patent No.: US 10,883,814 B2
(45) Date of Patent: Jan. 5, 2021

(54) HIGHLY STRETCHABLE STRAIN SENSOR FOR HUMAN MOTION MONITORING

(71) Applicant: South Dakota Board of Regents, Pierre, SD (US)

(72) Inventors: Zhengtao Zhu, Rapid City, SD (US); Yichun Ding, Rapid City, SD (US); Yongchen Yang, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 91 days.

(21) Appl. No.: 16/300,010

(22) PCT Filed: May 9, 2017

(86) PCT No.: PCT/US2017/031756
§ 371 (c)(1),
(2) Date: Nov. 8, 2018

(87) PCT Pub. No.: WO2017/196845
PCT Pub. Date: Nov. 16, 2017

(65) Prior Publication Data
US 2019/0145752 A1 May 16, 2019

Related U.S. Application Data

(60) Provisional application No. 62/333,635, filed on May 9, 2016.

(51) Int. Cl.
*G01B 7/16* (2006.01)
*D01F 6/18* (2006.01)
(Continued)

(52) U.S. Cl.
CPC .............. *G01B 7/18* (2013.01); *B29C 41/003* (2013.01); *B32B 5/022* (2013.01); *B32B 5/26* (2013.01);
(Continued)

(58) Field of Classification Search
CPC ......... G01B 7/18; B29C 41/003; B32B 5/022; B32B 5/26; B32B 27/08; B32B 27/12;
(Continued)

(56) References Cited

U.S. PATENT DOCUMENTS 8,108,157 B2 * 1/2012 Chase ...................... G01L 1/22
702/42
8,128,779 B2 3/2012 Ho et al.
(Continued)

OTHER PUBLICATIONS

The International Search Report and the Written Opinion, PCT/US2017/031756, dated Jul. 19, 2017, 14 pages.

*Primary Examiner* — Octavia Hollington
(74) *Attorney, Agent, or Firm* — Goodhue, Coleman & Owens, P.C.

(57) ABSTRACT

A method to assemble a highly stretchable and highly sensitive strain sensor. Carbon nanofibers prepared by electrospinning of PAN followed by stabilization and carbonization, are sandwiched in two layers of elastomer PU. The CNFs/PU strain sensor shows large strain range of 300%, high sensitivity with gauge factor up to 72.5, and superior stability and durability during 8000 cycles of stretch/release. The CNFs/PU strain sensor shows fast, stable and reproducible responses following the bending movement of fingers, wrists, and elbows. The flexible CNFs/PU strain sensor with has broad applications in wearable devices for human motion monitoring.

20 Claims, 11 Drawing Sheets

(51) Int. Cl.
| | |
|---|---|
| *D01F 9/22* | (2006.01) |
| *B32B 5/02* | (2006.01) |
| *B32B 27/40* | (2006.01) |
| *D01D 5/00* | (2006.01) |
| *B32B 27/12* | (2006.01) |
| *B82Y 30/00* | (2011.01) |
| *B32B 5/26* | (2006.01) |
| *B32B 27/38* | (2006.01) |
| *B32B 27/08* | (2006.01) |
| *B29C 41/00* | (2006.01) |
| *B29K 75/00* | (2006.01) |
| *B29L 7/00* | (2006.01) |

(52) U.S. Cl.
CPC .............. *B32B 27/08* (2013.01); *B32B 27/12* (2013.01); *B32B 27/38* (2013.01); *B32B 27/40* (2013.01); *B82Y 30/00* (2013.01); *D01D 5/003* (2013.01); *D01D 5/0038* (2013.01); *D01F 6/18* (2013.01); *D01F 9/225* (2013.01); *B29K 2075/00* (2013.01); *B29L 2007/008* (2013.01); *B32B 2250/03* (2013.01); *B32B 2250/40* (2013.01); *B32B 2260/021* (2013.01); *B32B 2260/046* (2013.01); *B32B 2262/106* (2013.01); *B32B 2307/20* (2013.01); *B32B 2307/51* (2013.01); *B32B 2307/54* (2013.01)

(58) Field of Classification Search
CPC ..... B32B 27/38; B32B 27/40; B32B 2250/03; B32B 2250/40; B32B 2260/021; B32B 2260/046; B32B 2262/106; B32B 2307/20; B32B 2307/51; B32B 2307/54; B82Y 30/00; B29K 2075/00; B29L 2007/008
USPC .......................................................... 73/776
See application file for complete search history.

(56) References Cited

U.S. PATENT DOCUMENTS

| | | | |
|---|---|---|---|
| 8,664,699 | B2 * | 3/2014 | Nuzzo ............... H01L 21/02521 257/213 |
| 2010/0140163 | A1 | 6/2010 | Peng et al. |
| 2012/0034512 | A1 * | 2/2012 | Zhang ..................... B32B 5/26 429/163 |
| 2012/0153236 | A1 | 6/2012 | Cakmak et al. |
| 2014/0065422 | A1 | 3/2014 | Kim et al. |
| 2015/0147573 | A1 * | 5/2015 | Zhang ..................... C04B 35/80 428/408 |
| 2015/0302949 | A1 | 10/2015 | Choi et al. |
| 2015/0360158 | A1 | 12/2015 | Menkhaus et al. |
| 2016/0054185 | A1 | 2/2016 | Servati et al. |
| 2016/0059517 | A1 | 3/2016 | Dhakate et al. |

\* cited by examiner

HIGHLY STRETCHABLE STRAIN SENSOR FOR HUMAN MOTION MONITORING

CROSS-REFERENCE TO RELATED APPLICATION

This application is a continuation of International Application No. PCT/US17/31756, filed May 9, 2017, which claims the benefit of U.S. Provisional Application Ser. No. 62/333,635 filed May 9, 2016, which are both incorporated by reference herein in their entirety.

GRANT REFERENCE

This disclosure was made with government support under # IIA-1355423 and #NNX13AD31A awarded by the NSF and NASA, respectively. The government has certain rights in the disclosure.

BACKGROUND

I. Field of the Disclosure

Novel methods, systems and processes for assembling a highly stretchable and highly sensitive strain sensor are disclosed. Carbon nanofibers (CNFs) can be sandwiched in two layers of elastomer polyurethane (PU) to form a sensor. The CNFs/PU strain sensor shows large strain range of 300%, high sensitivity with gauge factor up to 72.5, and superior stability and durability during 8000 cycles of stretch/release. These parameters distinguish the present invention from piezoresistive strain sensors reported in the recent literature. Additionally, the CNFs/PU strain sensor shows a fast, stable and reproducible response following the bending movement of finger, wrist, and elbow. A flexible CNFs/PU strain sensor exhibiting such properties can have broad applications in wearable devices for human motion monitoring.

II. Description of the Prior Art

Strain sensors detect the change of electrical characteristics such as current, resistance, or capacitance in response to the mechanical deformation. Recently, strain sensors for human motion monitoring, structural health monitoring, and electronic skin, etc. have attracted considerable attention. To detect human motions, e.g., the large-scale motions like bending of fingers, arms, or legs, strain sensors need to have high stretchability and sensitivity. However, conventional strain sensors, which are made of thin metal foils or semiconductors, typically detect only small strain (<5%) and have limited sensitivity (gauge factor ~2). Therefore, what is needed are stretchable sensors that have high stretchability of strain (e.g. up to 300%), high sensitivity of gauge factor (e.g. up to 72.5), and good durability and stability during the stretch/release test. What is further needed are strain sensor devices suitable for human motion monitoring, such as bending of finger, wrist and elbow; or in other words, an invention for broad applications in wearable devices for human motion monitoring.

SUMMARY

Highly stretchable and sensitive strain sensors are in great demand for human motion monitoring. The present disclosure provides a strain sensor based on electrospun carbon nanofibers (CNFs) embedded in polyurethane (PU) matrix. The piezoresistive properties and the strain sensing mechanism of the CNFs/PU sensor are investigated. The results show that the CNFs/PU sensor has high stretchability of strain up to 300%, high sensitivity of gauge factor as large as 72.5, and superior stability and reproducibility during the 8000 stretch/release cycles. Furthermore, the CNFs/PU sensors can be used for monitoring the movements of finger, wrist, and elbow bending, demonstrating that a strain sensor based on the CNFs/PU provides a flexible and wearable device for human motion monitoring.

According to at least one exemplary aspect, a method for assembling a highly stretchable and sensitive strain sensor is disclosed. The method contemplates forming a polyacrylonitrile (PAN) nanofibrous mat from electrospinning and producing a CNFs mat by carbonization of the PAN nanofibrous mat. A PU solution is film cast into a PU film and the CNFs mat and PU film can be assembled together. Electrical connections can be prepared on the CNFs mat. The assembled CNFs mat and PU film can be encapsulated by film casting a layer of PU on the CNFs mat for forming the strain sensor.

According to at least one other exemplary aspect, a highly stretchable and sensitive strain sensor is disclosed. The strain sensor can include a polyacrylonitrile (PAN) nanofibrous mat formed by electrospinning and a CNFs mat formed by carbonization of the PAN nanofibrous mat. A PU solution film can be cast into a PU film, and the CNFs mat and PU film can be assembled together. One or more electrical connections can be formed on the CNFs mat. The assembled CNFs mat and PU film can be encapsulated by film casting a layer of PU on the CNFs mat for forming the strain sensor.

According to another exemplary aspect a strain device for measuring human motion is disclosed. The human motion strain measuring device can include a polyacrylonitrile (PAN) nanofibrous mat formed by electrospinning and a CNFs mat formed by carbonization of the PAN nanofibrous mat. A PU solution film can be cast into a PU film, and the CNFs mat and PU film can be assembled together with one or more electrical contacts on the CNFs mat. The assembled CNFs mat and PU film can be encapsulated by film casting a layer of PU on the CNFs mat for forming the human motion measuring strain device. In a preferred aspect, the strain device is disposed on a portion of the human body for measuring bending movement.

BRIEF DESCRIPTION OF THE DRAWINGS

Illustrated embodiments of the disclosure are described in detail below with reference to the attached drawing figures, which are incorporated by reference herein, and where:

FIG. 1a) is a pictorial representation of a fabrication process for a CNFs/PU stretchable strain sensor;

FIGS. 1b)-1d) are pictorial representations of cross-sectional SEM images of the strain sensor shown in FIG. 1a);

FIG. 2a) is a pictorial representation of a strain sensor stretched to different strains;

FIG. 2b) is a pictorial representation of typical stress-strain curves for the neat PU film and the strain sensor;

FIG. 2c) is a pictorial representation of a plot illustrating resistance versus applied strain of the strain sensor during a first stretch cycle;

FIG. 2d) is a pictorial representation of a plot illustrating relative resistance change ($\Delta R/R0$) versus applied strain of the strain sensor during the first stretch cycle;

FIG. 2e) is a pictorial representation of a plot illustrating gauge factor (GF) versus applied strain of the strain sensor at the first stretch cycle, wherein the regions i, ii, and iii correspond to "break phase", "slide phase" and "disconnect phase", respectively;

FIGS. 5A1-5A2 are pictorial representations of cross-sectional SEM images of the strain sensor after being stretched to 300% at cycle 1;

FIGS. 5B1-5B2 are pictorial representations of cross-sectional SEM images of the strain sensor after being stretched to 300% at cycle 5;

FIGS. 5C1-5C2 are pictorial representations of cross-sectional SEM images of the strain sensor after being stretched to 300% at cycle 10;

FIGS. 5D1-5D2 are pictorial representations of cross-sectional SEM images of the strain sensor after being stretched to 300% at cycle 100;

BRIEF DESCRIPTION OF THE TABLES

Figure 1:
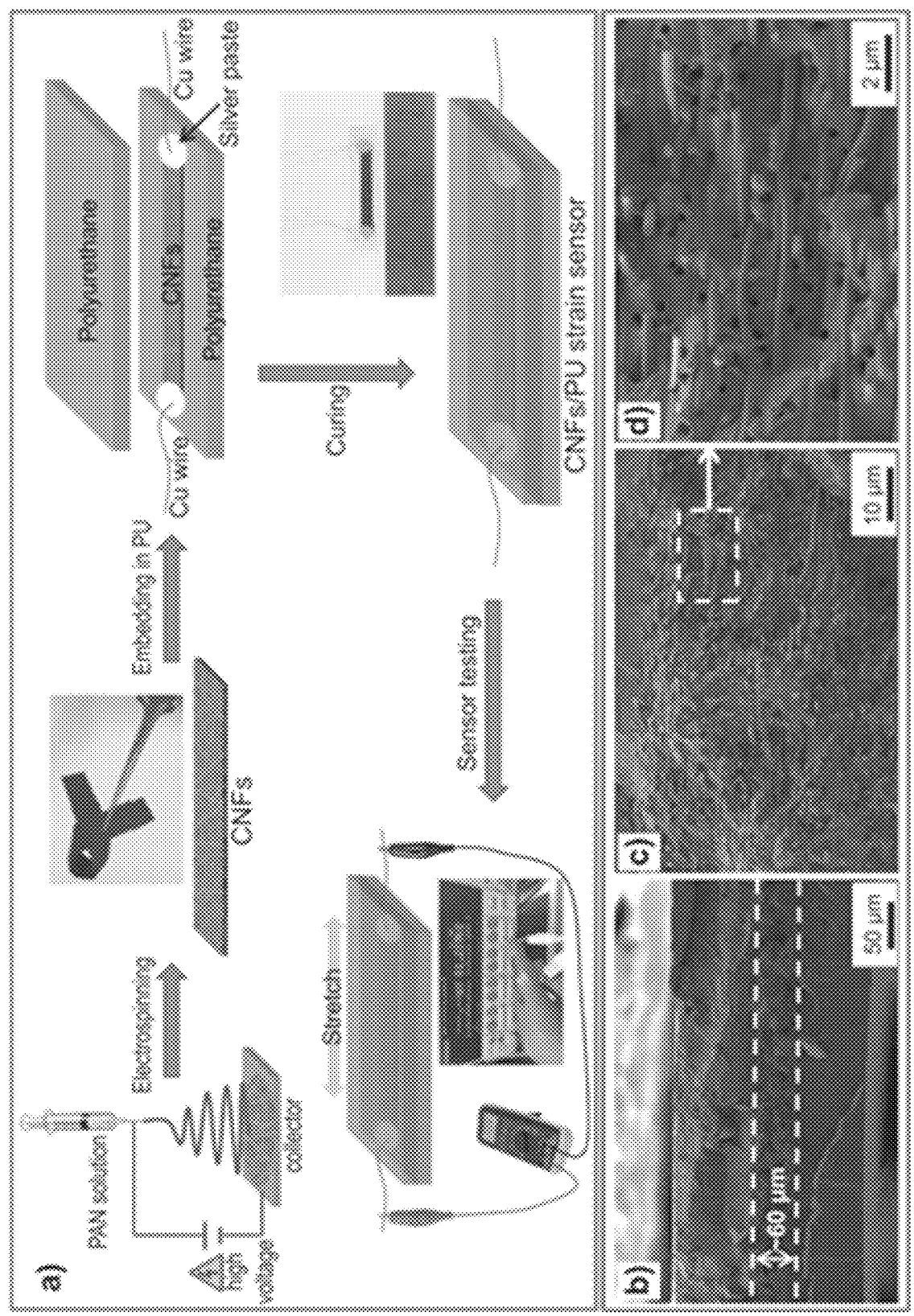

Illustrated embodiments of the disclosure are described in detail below with reference to the attached Tables, which are incorporated by reference herein, and where:

Table S1: Comparison of performances of piezoresistive strain sensors of the present disclosure and reported in the art.

DETAILED DESCRIPTION

1. Introduction

Strain sensors detect the change of electrical characteristics such as current, resistance, or capacitance in response to mechanical deformation. Recently, strain sensors for human motion monitoring, structural health monitoring, and electronic skin, etc. have attracted considerable attention. To detect human motions, e.g. the large-scale motions like bending of fingers, arms, or legs, strain sensors need to have high stretchability and sensitivity. However, conventional strain sensors, which are made of thin metal foils or semiconductors, typically detect only small strain (<5%) and have limited sensitivity (gauge factor ~2). Therefore, strain sensors with good stretchability and high sensitivity for human motion monitoring are disclosed.

The present disclosure achieves all its intended objectives by disclosing strain sensors with high strain range and sensitivity by fabricating piezoresistive elastic composites from, in at least one aspect, mixing conductive filler with stretchable rubber/elastic polymer. The change of resistance due to the change of the inter-filler distance during the stretch of the composite can be used to detect strain. Various nanomaterials such as metallic nanoparticle/nanowire, Si nanowire, carbon nanotube (CNT), and graphene can be used as conductive fillers. Strain sensors using metal nanoparticle as a filler can achieve high sensitivity because of the high resistance change during stretching; however the disconnect between the nanoparticles under high strain leads to formation of irreversible inter-particle gaps/cracks, with the devices only operating with limited strain range. The strain sensors based on one dimensional metal nanowire (such as Ag nanowire) and CNT can measure high strain but have relative low sensitivity. Furthermore, the preparation methods for these nanomaterial fillers and the piezoresistive elastic composites can be time-consuming and expensive. For example, Si nanowire, CNT, and graphene, can typically be prepared by chemical vapor deposition (CVD). To fabricate the strain sensors, the fillers are typically dispersed in a solvent to form suspensions/inks, and patterning/deposition of the inks often involves complicated processing steps.

In the present disclosure, highly stretchable, sensitive strain sensors using flexible and free-standing electrospun carbon nanofibers (CNFs) embedded in a polyurethane (PU) elastomer are disclosed. The CNFs can be prepared by electrospinning of polyacrylonitrile (PAN) followed by stabilization and carbonization. The strain sensor can be assembled by sandwiching the free-standing CNF mat in two PU substrates. The piezoresistive properties and the sensing mechanism of the prepared CNFs/PU stretchable strain sensors are of significant interest to meet the objectives of the present disclosure. The results show that the sensors of the present disclosure have high stretchability of strain up to 300%, high sensitivity of gauge factor up to 72.5, and good durability and stability during the stretch/release test for 8000 cycles. In addition, the present disclosure demonstrates human motion monitoring of finger, wrist and elbow bending using the strain sensor.

2. Experimental 2.1 Materials

The materials included, but are not limited to, Polyacrylonitrile (PAN) (MW=150,000) powder, tetrahydrofuran (THF, >99.9%) and N,N-dimethylmethanamide (DMF, 99.8%), which are acquirable from Sigma-Aldrich Chemical Co. (St. Louis, Mo., USA). Other materials included, but are not limited to, thermoplastic polyurethane (PU85A) which is acquirable from Shenzhen Huayang plastic raw materials factory (Shenzhen, China). Although specific materials, amounts and providers are listed, these are provided by way of example as these properties can change in order to meet the objectives of the present disclosure.

2.2 Preparation of Electrospun Carbon Nanofibers (CNFs)

Electrospun carbon nanofibers (CNFs) can be prepared by electrospinning. First, a 12 wt % PAN solution can be prepared by dissolving PAN in a mixture solvent of DMF/THF (mass ratio 9:1). The PAN solution is filled in a plastic syringe (with a metal spinneret). During the electrospinning process, a DC positive voltage of 15 kV can be applied to the spinneret, and the feed rate of the PAN spin dope is set, for example, as 1.0 mL/h. A grounded aluminum foil can be used as a collector, and the distance between the spinneret and the collector can be, for example, about 20 cm. After electrospinning, a nonwoven PAN nanofibrous mat is obtained. The mat can be dried in a vacuum oven at 100° C. for 6 hours prior to the oxidative stabilization and carbonization treatments.

The oxidative stabilization of the PAN nanofibrous mat can be carried out in a muffle furnace. In at least one example, the mat is first heated up to 250° C. at a rate of 1° C./min, and then the temperature is maintained at 250° C. for 3 hours. During the process, a constant air flow can be used to facilitate sufficient oxidative stabilization of PAN. Thereafter, the stabilized PAN nanofibers are transferred into a tube furnace for carbonization. The temperature, for example, is increased stepwise to 600, 800, 1000, and 1200° C. at a rate of 5° C./min, and the furnace is held at each temperature for 1 hour. Finally, CNFs can be obtained after cooling down the furnace to room temperature. Inert Argon atmosphere can be used during the carbonization and cooling steps.

2.3 Assembly of Strain Sensor Device

Figure 8:
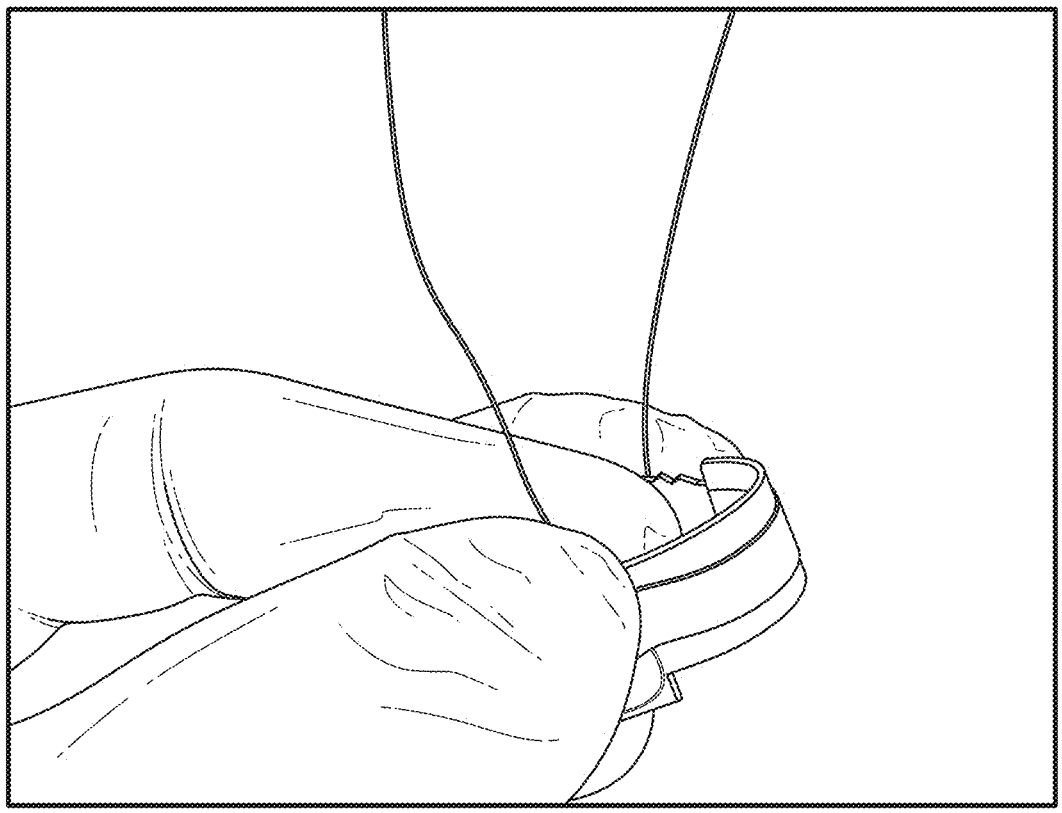
FIG. 8 is a pictorial representation of a flexible CNFs/PU strain sensor in accordance with an exemplary aspect of the present disclosure.

PU granules can be dissolved in DMF to prepare a 15 wt % PU solution, and then a thin layer of PU film can be coated on a clean glass substrate by film casting of the PU solution. After the PU film is dried, a piece of CNFs mat can be placed on the PU film. In at least one example, the piece is about 4 mm wide and 20 mm long, cut readily with a scissor. The two ends of the CNFs mat are brushed with silver paste, and the copper wires are welded for the electric contacts. Thereafter, a layer of PU can be cast on the surface of the CNFs mat to encapsulate the device. After the PU film is cured, a free-standing and flexible strain sensor device (FIG. 8) can be obtained by peeling off the film from the glass substrate.

3. Results and Discussion

Figure 9:
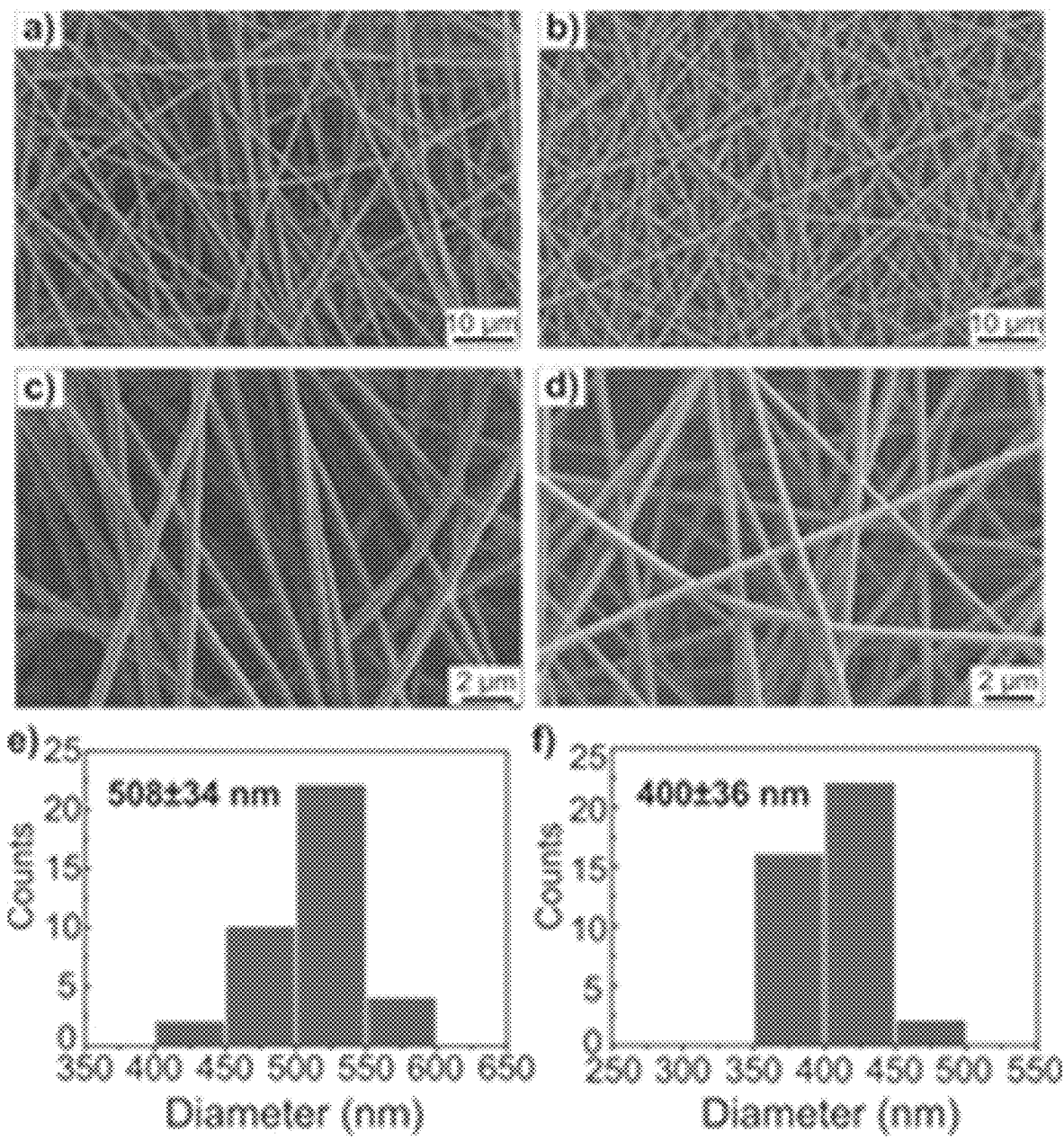
FIG. 9a) is a pictorial representation of an SEM image of electrospun PAN nanofibers.
FIG. 9b) is a pictorial representation of an SEM image of electrospun CNF nanofibers.
FIG. 9c) is a pictorial representation of an SEM image of electrospun PAN nanofibers.
FIG. 9d) is a pictorial representation of an SEM image of electrospun CNF nanofibers.
FIG. 9e) is a pictorial representation of a plot illustrating diameter distributions of the PAN nanofibers.
FIG. 9f) is a pictorial representation of a plot illustrating diameter distributions of the CNF nanofibers.

Electrospinning is a versatile technique that can prepare polymeric, ceramic, carbonaceous, and composite fibrous materials with the diameters ranging from tens of nanometers up to several microns. PAN based carbon nanofiber is considered an outstanding material for applications in energy conversion and storage devices, catalysts, and electrochemical sensors, because of its good electrical conductivity, high aspect ratio, and high specific surface area. In the present disclosure, CNFs are prepared by electrospinning of the PAN solution followed with oxidative stabilization and carbonization treatments. FIG. 9a) and FIG. 9c) show the SEM images of the as-spun PAN nanofibers. The continuous PAN nanofibers are randomly overlaid with diameters of 508±34 nm (FIG. 9e)). After stabilization and carbonization treatments, the obtained CNFs (FIG. 9b and FIG. 9d)) have smaller diameters of 400±36 nm (FIG. 9f)). In addition, the CNFs mat is free-standing and flexible, as shown in the optical image of the CNFs mat (the first inset in FIG. 1a). The free-standing CNFs mat can be readily cut into different sizes for assembly of the strain sensor.

The assembly process of the CNFs/PU strain sensor is schematically depicted in FIG. 1a). The as-spun CNFs mat is first cut into long stripes with desired dimensions. The piece is then placed on a PU film on a glass substrate. Finally, another layer of PU is cast to seal the device. After the PU film is cured, the device can be peeled off from the glass substrate. Optical images of a strain sensor are shown in FIG. 1a (the second inset in FIG. 1a) and FIG. 8. The thickness of the CNFs layer is about 60 μm (FIG. 1b), and each PU layer is about 120 μm. The cross-sectional SEM images of the device show that the CNFs are embedded in the PU matrix (FIGS. 1c and 1d). Continuous nanofibers, broken nanofiber ends, and holes are observed in the cross-section of the CNFs layer, indicating that the CNFs are randomly overlaid in the PU matrix. The nanofibers parallel with the cut direction are continuous, and the nanofibers not aligned with the cut direction were broken or pulled out when the device is fractured in liquid nitrogen for SEM characterization.

Figure 2:
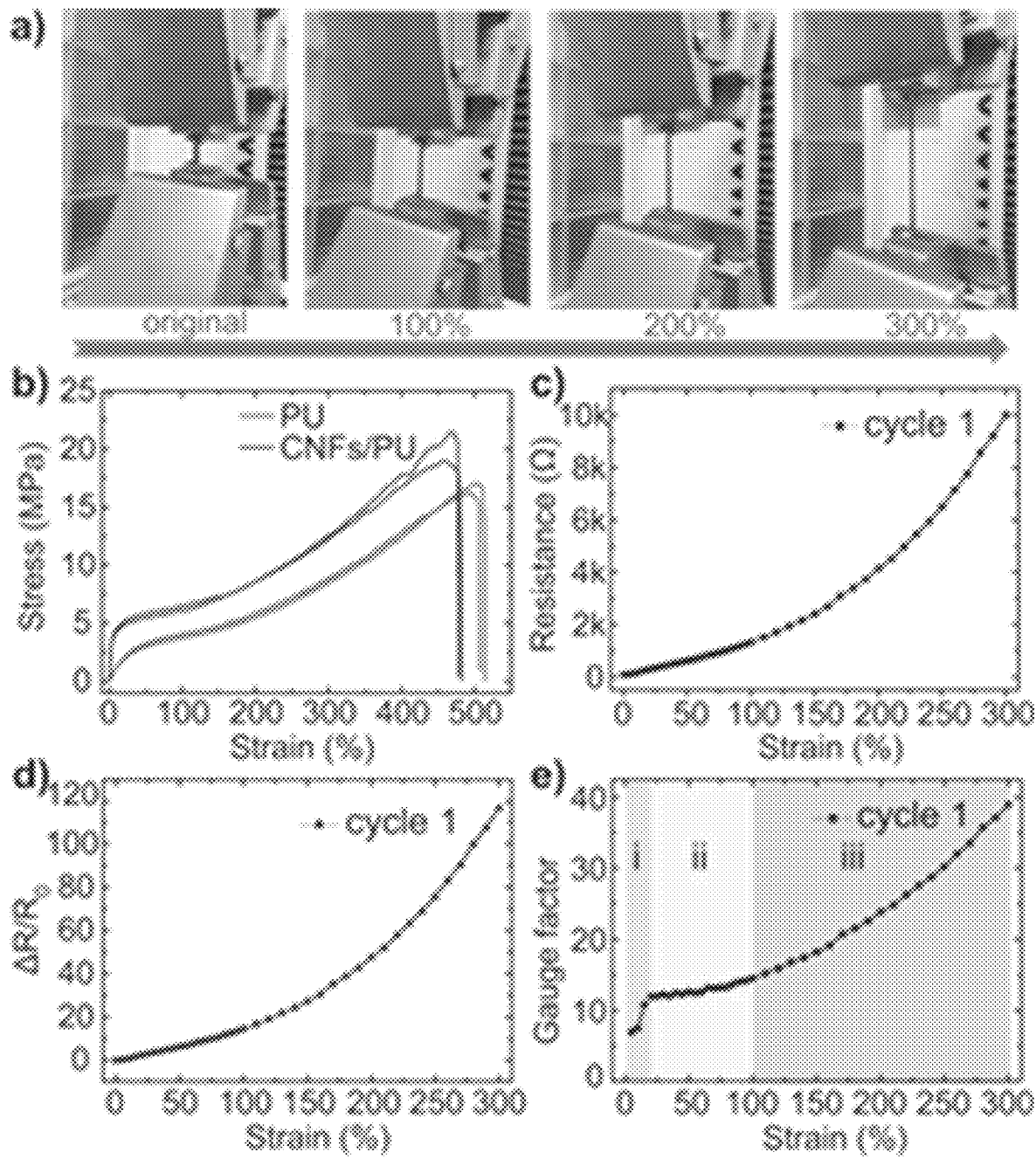
Figure 10:
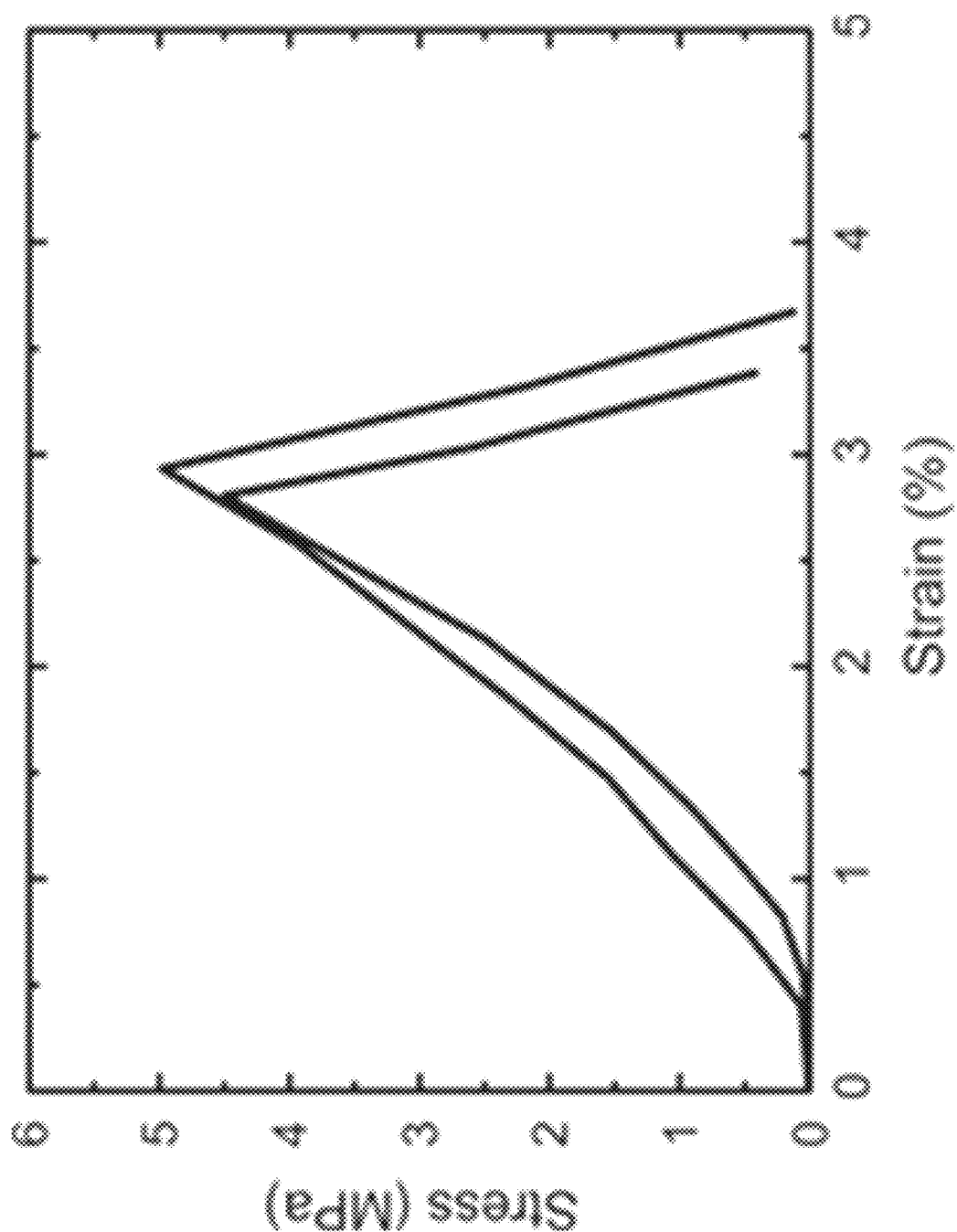
FIG. 10 is a pictorial representation of a plot illustrating typical stress-strain curves of an electrospun carbon nanofibers mat.
Figure 11:
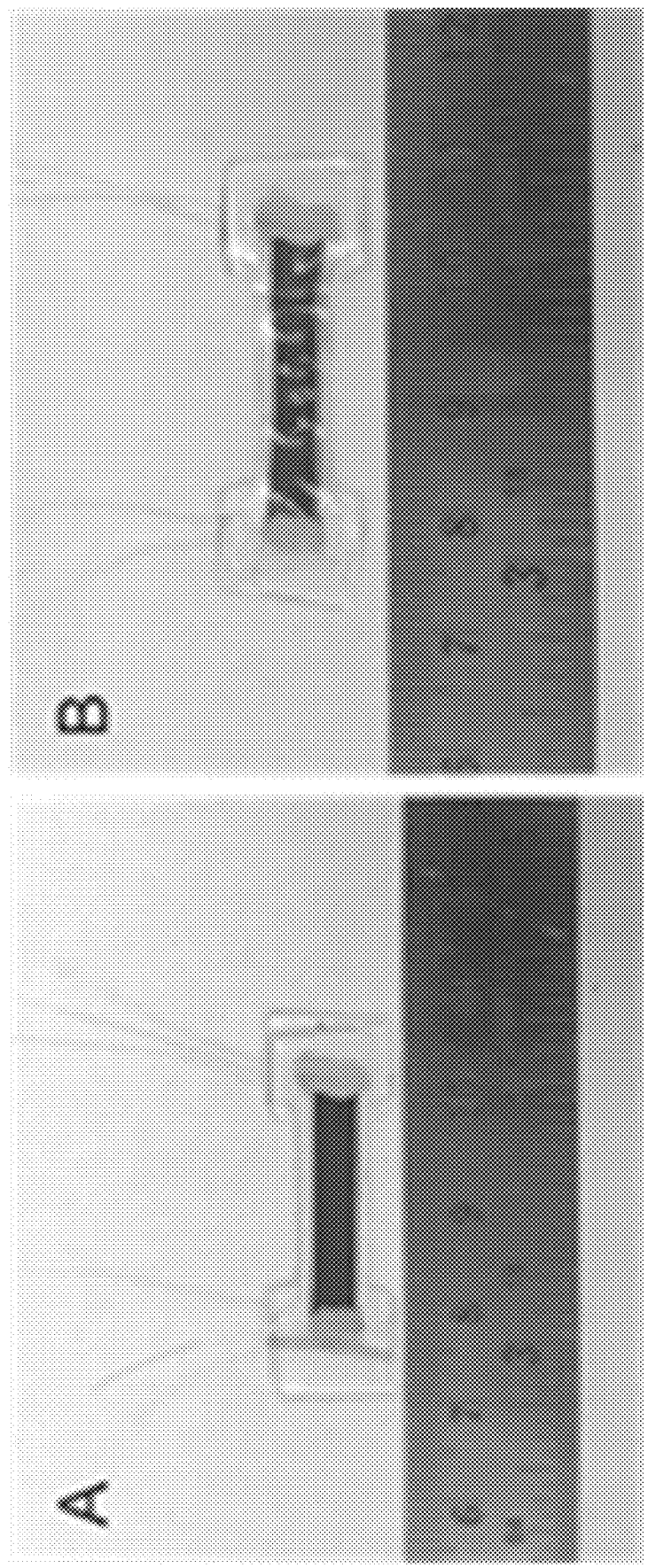
FIGS. 11A-11B are pictorial representations of a strain sensor unstretched (A) and after stretched 350% (B).

Thermoplastic polyurethane (PU) is a highly elastic polymeric material that can tolerate strain higher than 500%. FIG. 2a) shows the optical images of a strain sensor with initial length of 1.0 cm being stretched to 100%, 200% and 300%. The stress-strain curves of PU and the CNFs/PU (FIG. 2b) show typical elastomer behavior. The stress of the neat PU film is about 15 MPa at the break strain of 510%. The stress of the CNFs/PU material is about 20 MPa at the break strain of 480%; both values of the stress and strain are similar to those of the neat PU film. The difference is likely related to the stress-strain property of the electrospun carbon nanofibers. As shown in FIG. 10, the CNFs mat can only withstand strain less than 4% before break. Even though the strain of the CNFs/PU strain sensor is as high as 480% before break, the strain sensor is tested up to 300% strain. One reason is that the CNFs/PU sensor cannot fully recover to the initial length when the strain is higher than 350% (FIG. 11); another reason is that the 300% strain would be sufficient to detect most large-scale human body motions.

FIG. 2c) shows the resistance (R) versus the applied strain ($\varepsilon=\Delta L/L0$) of the CNFs/PU strain sensor at first stretch cycle. Here, L0 is the initial length of the strain sensor, $\Delta L$ is the length difference of the sensor at the stretched condition and the initial length. The sensor had a low initial resistance (R0) of about 85Ω, suggesting the good conductivity of the CNFs mat. When stretched, the resistance (R) of the sensor increased. The resistance of the device at the strain of 300% is about 10 kΩ FIG. 2d) plots the relative resistance change ($\Delta R/R0$) versus the applied strain, where ΔR is the resistance change (ΔR=R−R0). At the strain of 300%, the resistance of the device increased about 2 orders of magnitude.

The gauge factor (GF), defined as $GF=(\Delta R/R_0)/\varepsilon$, measures the sensitivity of a strain sensor. FIG. 2e) shows the variation of GF with the strain for the CNFs/PU device at the first stretch cycle. For the CNFs/PU strain sensor being stretched to 300% strain at the first stretch cycle, the change of GF could be divided to three different regions. In the strain range between 0 to 20%, GF increased sharply and reached to 12 at 20% strain; in the range of 20% to 100% strain, GF was nearly constant; in the strain range of 100% to 300%, GF increased significantly from 14 to 40.

Figure 3:
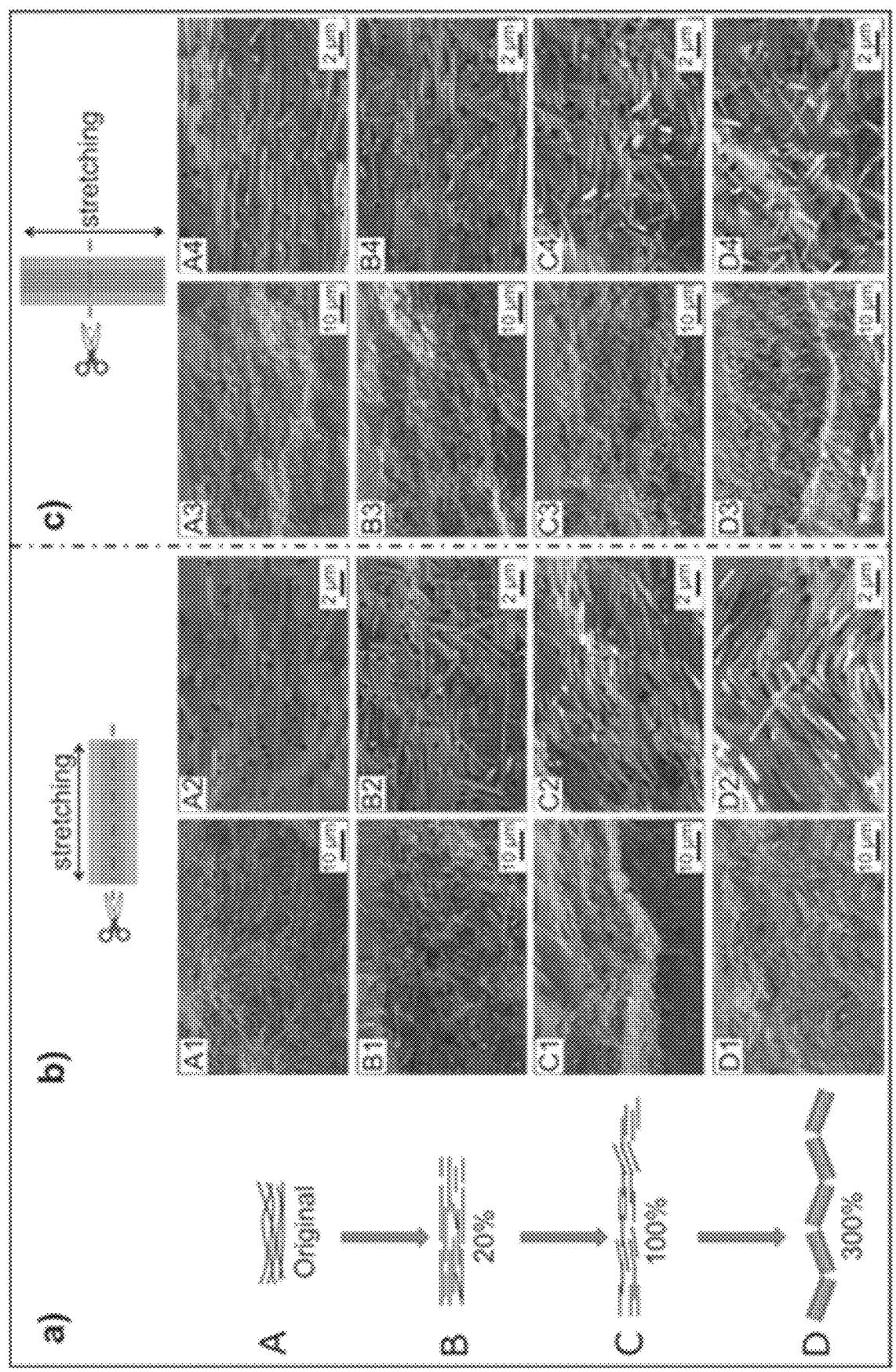
FIG. 3a) is a pictorial representation of the morphological changes of CNFs at the first stretch cycle.
FIG. 3b) is a pictorial representation of cross-sectional SEM images of the strain sensor cut along the stretch direction after being stretched for different strains.
FIG. 3c) is a pictorial representation of cross-sectional SEM images of the strain sensor cut perpendicular to the stretch direction after being stretched for different strains.

The change of the gauge factor can be explained by the morphological evolution of CNFs during the stretch of the device. FIG. 3a shows the schematic of the morphology of CNFs at different strains; the corresponding SEM images of the cross-sections of the device parallel and vertical to the stretch direction are shown in FIGS. 3b) and 3c), respectively. The change of morphology/GF can be separated into three phases, correlated to the three regions of FIG. 2e). At the initial state (A), the random-overlaid CNFs embedded in the PU matrix (SEM images A1-4) are continuous. For the strain range of 0 to 20% (phase i, "break phase"), the CNFs start to break during stretching. As seen in the SEM images (B1-4) of the device after 20% strain, the CNFs are broken into short fibers, which leads to rapid increase of the resistance and the GF. For the strain range of 20-100% (phase ii, "slide phase"), more fibers can be broken into short fibers, and the shortened fibers can slide through each other. The SEM images (C1-4) of the device after 100% strain are shown in FIG. 3. Parallel to the stretch direction (C1, C2), shortened nanofibers are observed with orientation along the stretch direction, and the wavy structure of the CNFs mat indicates the sliding of the nanofibers; vertical to the stretching direction, few holes are observed in C4, suggesting that there are few long fibers after stretching to 100% strain. In this phase, even though the shortened carbon fibers can slide in the matrix, the connection between these nanofibers remain relatively constant, hence the GF is nearly constant in phase ii (FIG. 2e). When the strain is higher than 100% (phase iii, "disconnect phase"), the CNFs begin to form wavy islands of shortened fibers parallel to the stretching direction (SEM images D1-4), and the connection between these islands determines the resistance of the device. With continuous stretching, the wavy islands of the CNF bundles become less connected, leading to significant increase of resistance and the resultant GF in FIG. 2e).

Figure 4:
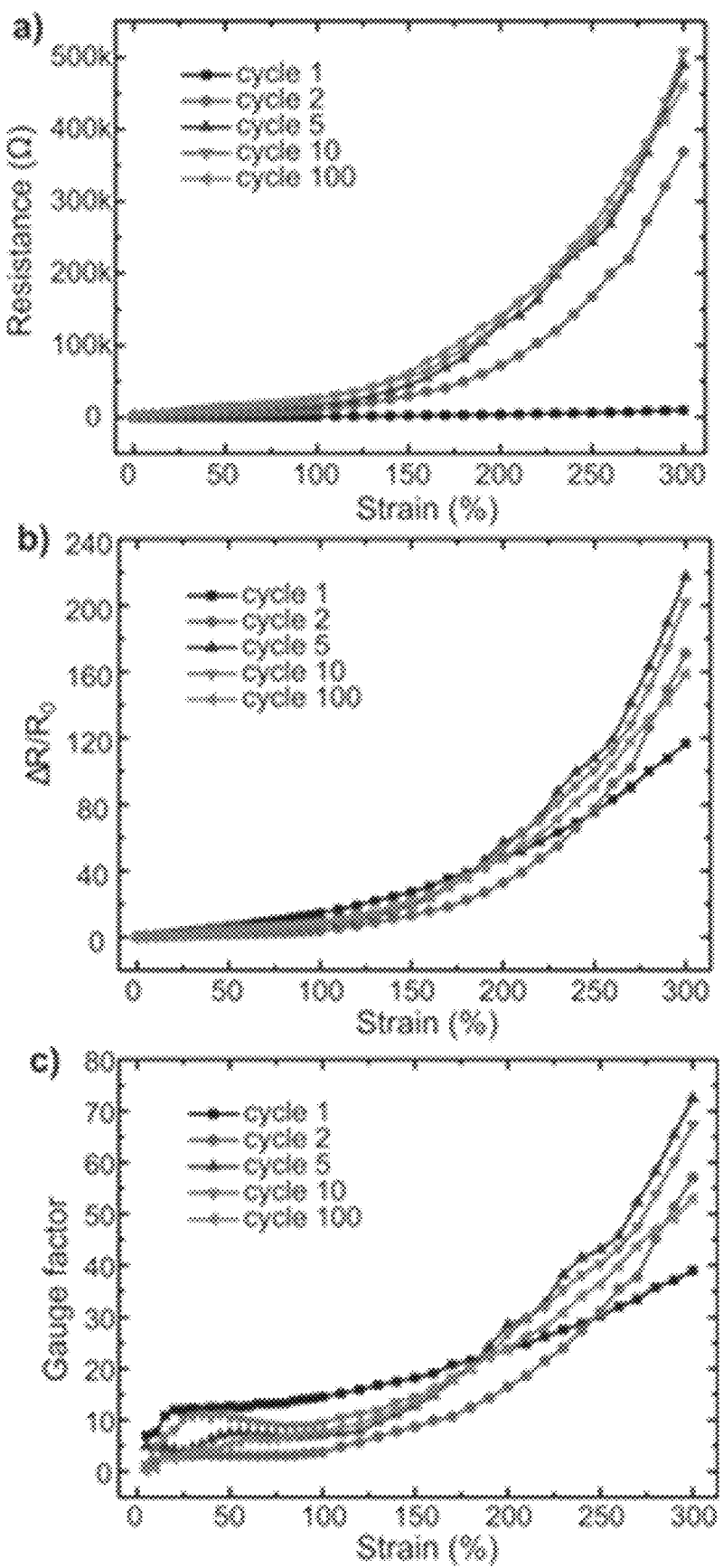
FIG. 4a) is a pictorial representation of a plot illustrating resistance of the strain sensor at the stretch/release cycle of 1, 2, 5, 10 and 100.
FIG. 4b) is a pictorial representation of a plot illustrating ΔR/R0 of the strain sensor at the stretch/release cycle of 1, 2, 5, 10 and 100.
FIG. 4c) is a pictorial representation of a plot illustrating gauge factor of the strain sensor at the stretch/release cycle of 1, 2, 5, 10 and 100.

After being stretched to 300% for the first time, the CNFs/PU strain sensor returned to the initial length when the stress is released. However, because the CNFs are broken into short fibers during stretching, the resistance of the device increased to about 2 kΩ. In the next few stretch/release cycles, the irreversible change of the resistance with the strain continued, until the morphology of the CNFs/PU composite became stable. FIG. 4 shows the behavior of the strain sensor for the first 100 stretch/release cycles. At the second cycle, the resistance of the device rise to about 360 kΩ at 300% strain, indicating the continuous shortening of the carbon nanofibers. After the 10 stretch/release cycle, the resistance at 0% and 300% strain stabilizes at values of ~2.5 kΩ and 500 kΩ, respectively. As shown in FIGS. 4b) and 4c), the ΔR/R0 and GF follows the similar trend. The GF reached as large as 72.5 at 300% at the stretch/release cycle 5. Compared with the one at the first cycle, the GF versus strain curve at stretch/release cycle 100 did not have a distinguished phase i ("break phase") region, but had similar "slide phase" (0-100%) and "disconnect phase" (100-300%) behavior. Note that the GF at 300% strain for cycle 100 is slightly lower than those at cycle 5 and 10. This is likely related to the increased initial resistance and decreased resistance at high strain due to the subtle changes of the morphology.

Figure 5:
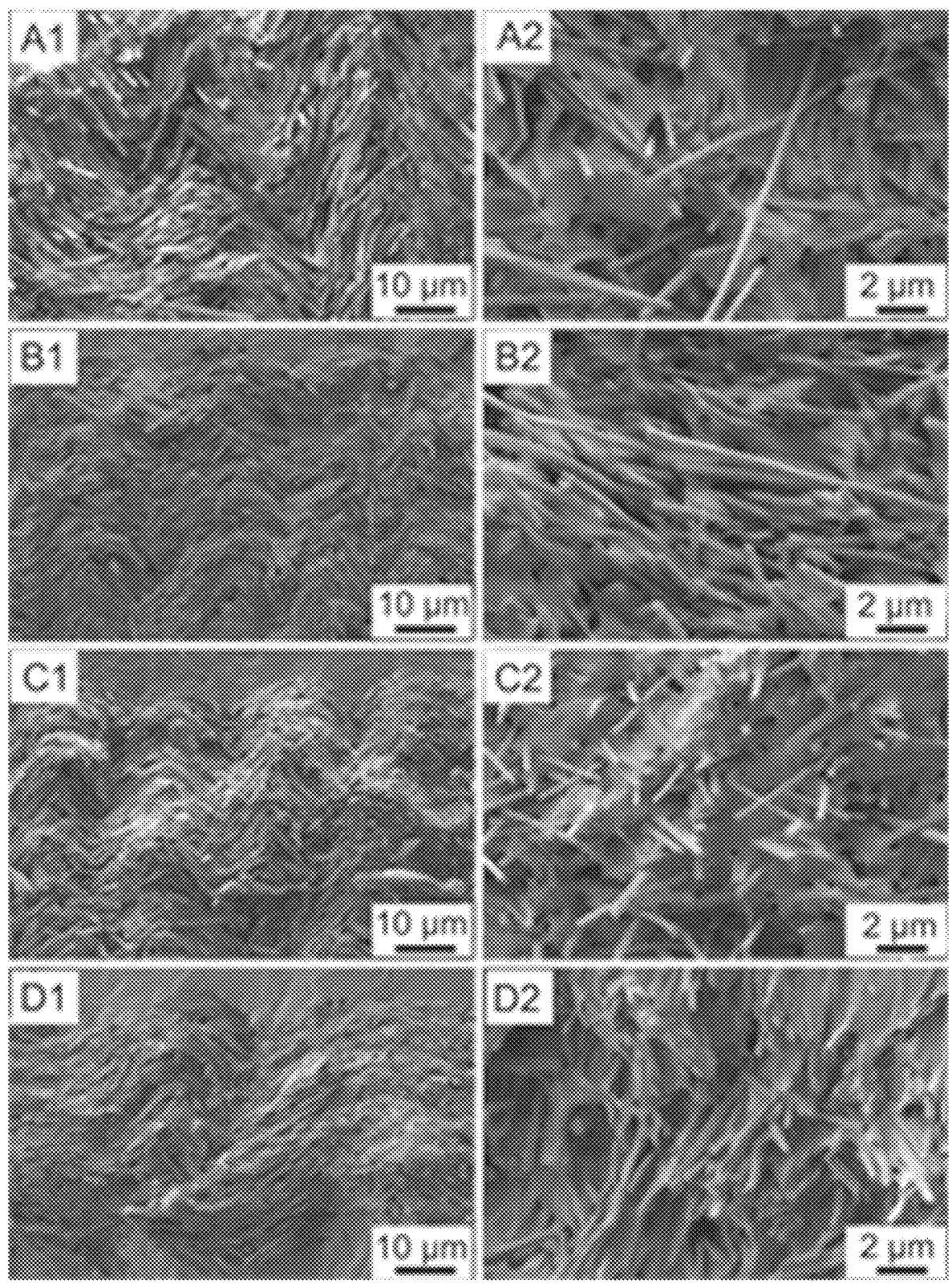

The results of the strain sensor behavior in FIG. 4 can be correlated to the morphology of the CNFs/PU composite during the stretch/release cycles. As discussed before, during the first stretch/release cycle, the long carbon nanofibers are shortened and the shortened nanofibers form bundles (FIG. 5 A1, A2). The shortening of the nanofibers leads to irreversible resistance change after the first stretch/release cycle. The irreversible CNFs shortening continues in the next few cycles. After stretched for 5-10 cycles, most of the CNFs are broken to short fibers, and the stable bundles of the shortened CNFs are formed. As observed in the SEM images (FIG. 5 A1-C1), uniform nanofiber bundles are formed after 10 cycles (C1), and the nanofiber bundles form wavy structures with a period of about 20 μm. In the SEM images A2-C2 shows that the CNFs become shorter and better embedded in the PU matrix with repeatedly stretch/release of the device. After most of the CNFs are shortened and form bundles during the stretch/release cycle, the resistance change of the device is determined by the sliding and connection of the CNF bundles, resulting in stable and reversible strain sensor behavior.

Figure 6:
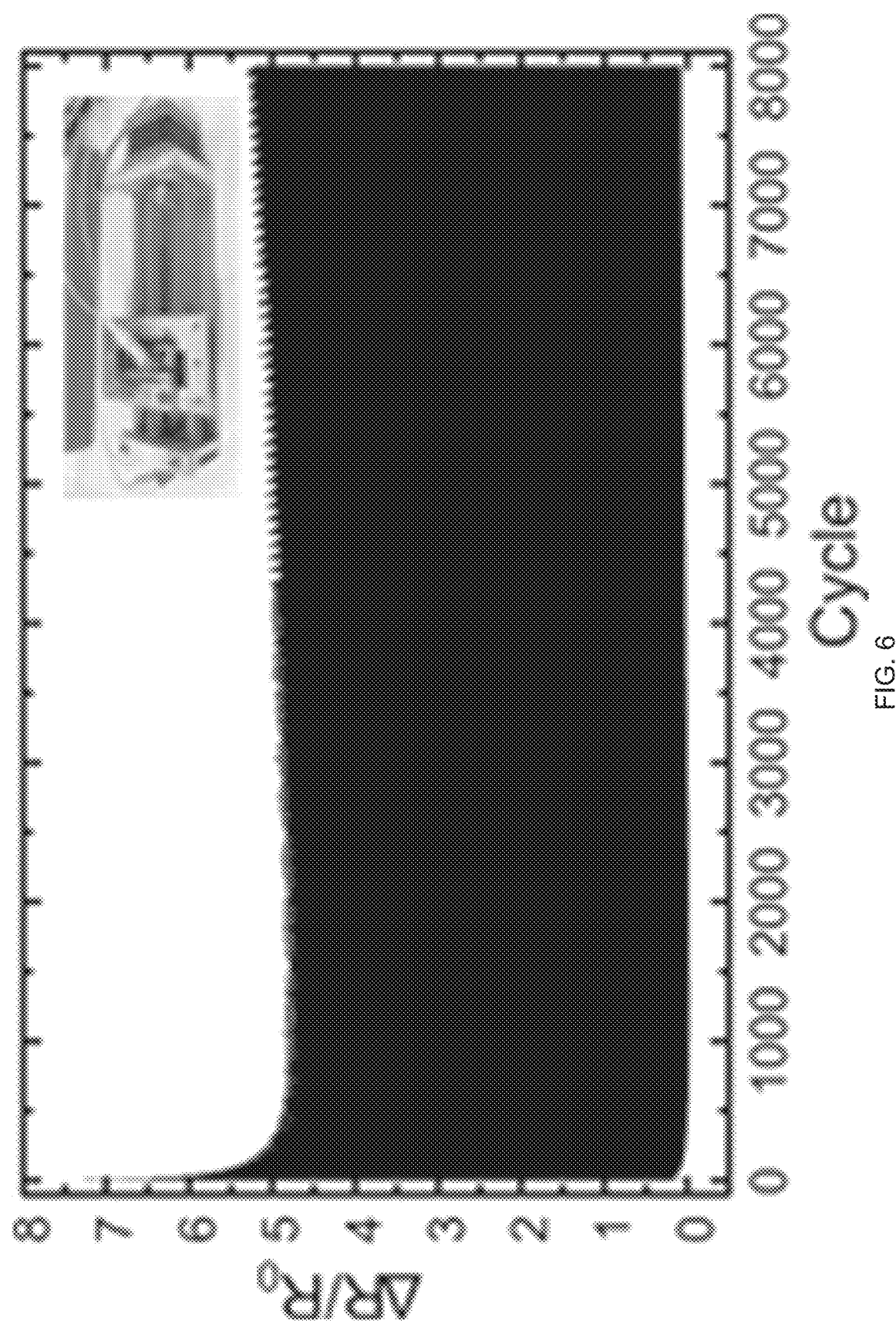
FIG. 6 is a pictorial representation of a plot illustrating relative resistance change (ΔR/R0) versus cycle number for a strain sensor being stretched to 100% strain for 8000 cycles, wherein a stretch/release cycle test apparatus is also shown in the inset.
Figure 7:
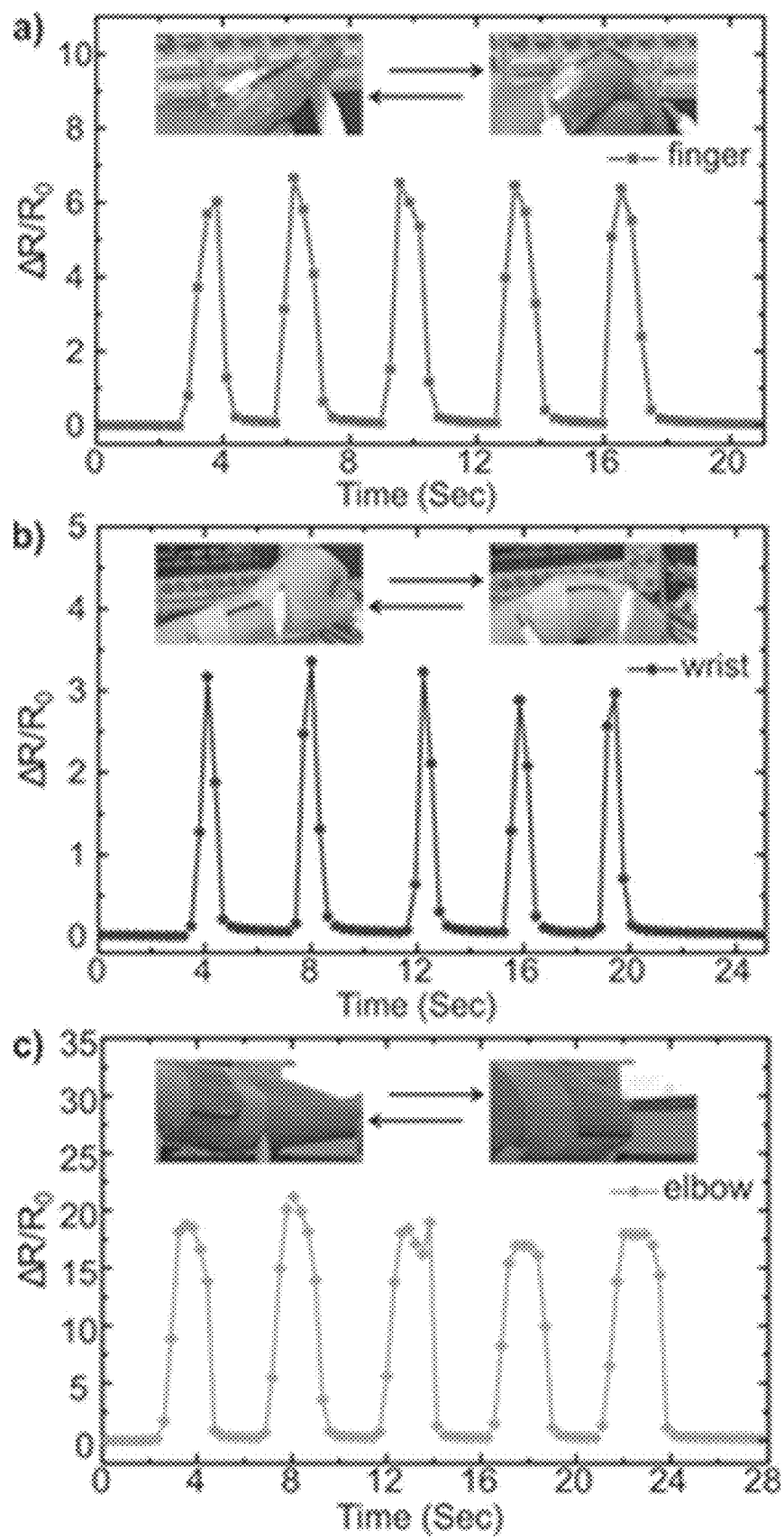
FIG. 7a) is a pictorial representation of a plot illustrating the response (ΔR/R0) of the CNFs/PU strain sensors following the bending motion of the finger, wherein further pictorial representations of the flat and bending states of the finger are provided in the insets.
FIG. 7b) is a pictorial representation of a plot illustrating the response (ΔR/R0) of the CNFs/PU strain sensors following the bending motion of the wrist, wherein further pictorial representations of the flat and bending states of the wrist are provided in the insets.
FIG. 7c) is a pictorial representation of a plot illustrating the response (ΔR/R0) of the CNFs/PU strain sensors following the bending motion of the elbow, wherein further pictorial representations of the flat and bending states of the elbow are provided in the insets.

The stability, reversibility, and durability of the CNFs/PU strain sensor can be tested using a home-made stretch/release apparatus (inset of FIG. 6). The stretch and release cycle is controlled by a computer-controlled motor. The sensor is first manually stretched to 100% for one cycle to shorten the CNFs before used for cycle test. The cycle test is performed for 8000 stretch/release cycles up to 100% strain. The ΔR/R0 versus cycle number is shown in FIG. 6. The ΔR/R0 decreased during the first 100 cycles, and then becomes stable. This result is consistent with morphological observations (FIG. 5) that the irreversible shortening of the carbon nanofiber is complete after 100 cycles. For practical application, the first 100 cycles can be considered a device "aging" step. The device shows superior stability and reversibility during the 8000 cycle test.

TABLE S1

Comparison of performances of piezoresistive strain sensors of the present disclosure and related art.

| Materials | Prepare/assembly method | Stretchability | Gauge factor | Reference |
|---|---|---|---|---|
| Ag nanoparticles | transfer ink patterning | 20% | 2.05 | Lee, J. et al. |
| Ag nanowires | drop casting | 70% | 2-14 | Amjadi, M., et al. |
| PANI/Au nanowire | Chinese penbrush | 100% | 13 | Gong, S., et al. |

TABLE S1-continued

Comparison of performances of piezoresistive strain sensors of the present disclosure and related art.

| Materials | Prepare/assembly method | Stretchability | Gauge factor | Reference |
| --- | --- | --- | --- | --- |
| Si nanowires | writing vapor-liquid-solid process | 50% | 350 | Zhang, B. -C., et al. |
| Carbon nanotubes | dry-spun | 900% | 64 | Ryu, S., et al. |
| | layer-by-layer drop casting | 100% | 62.7 | Roh, E., et al. |
| | drop at surface | 530% | 12-25 | Darabi, M. A., et al. |
| graphene | soaking | 800% | 35 | Boland, C. S., et al. |
| | layer-by-layer assembly | 150% | — | Park, J. J., et al. |
| | embedding | 100% | 7.1 | Yan, C., et al. |
| Electrospun carbon nanofibers | Electrospinning & sandwiching | 300% | 72.5 | Present disclosure |

Table.S1 compares the performance of the CNFs/PU strain sensor in this work and the ones reported in the related art. The CNFs/PU strain sensor show excellent stretchability and sensitivity. Preparation of the CNFs by electrospinning makes it easy to tailor the size and the shape of the conductive component of the strain sensor, and the sandwiched device structure which embeds the CNFs in a polymeric elastomer can be readily processed and integrated into arrays of strain sensors.

Finally, the capability of the CNFs/PU strain sensor for detecting human motions is disclosed. Large-scale motions of finger, wrist and elbow bending can be monitored using the CNFs/PU strain sensor. A device "aging" step is carried out prior to the test. The response of the finger, the wrist and the elbow bending is shown in FIG. 7 and FIGS. 8-10. The relative resistance changes ($\Delta R/R0$) during the bending of the finger, the wrist, and the elbow are about 6, 3 and 20, respectively. Obviously, the motion of the elbow gives higher strain (deformation), which is measured by the large resistance change; on the other hand, the bending of the wrist is limited, resulting in the small resistance change.

4.0. Conclusion

The present disclosure provides a simple method to assemble a highly stretchable and highly sensitive strain sensor. Carbon nanofibers prepared by electrospinning of PAN followed by stabilization and carbonization, are sandwiched in two layers of elastomer PU. The CNFs/PU strain sensor shows large strain range of 300%, high sensitivity with gauge factor up to 72.5, and superior stability and durability during 8000 cycles of stretch/release. These parameters meet the intended objectives of the present disclosure and distinguish the present disclosure from the piezoresistive strain sensors reported in the art. Additionally, the CNFs/PU strain sensor shows fast, stable and reproducible responses following the bending movement of fingers, wrists, and elbows. A flexible CNFs/PU strain sensor with the properties disclosed herein can have broad applications in wearable devices for human motion monitoring.

LIST OF REFERENCES CITED

The following documents are cited in this application, and are incorporated herein in their entirety:

M. L. Hammock, A. Chortos, B. C. K. Tee, J. B. H. Tok and Z. Bao, Advanced Materials, 2013, 25, 5997-6038.

T. Yamada, Y. Hayamizu, Y. Yamamoto, Y. Yomogida, A. Izadi-Najafabadi, D. N. Futaba and K. Hata, Nature Nanotechnology, 2011, 6, 296-301.

Y. Wang, L. Wang, T. Yang, X. Li, X. Zang, M. Zhu, K. Wang, D. Wu and H. Zhu, Advanced Functional Materials, 2014, 24, 4666-4670.

K. Inpil, J. S. Mark, H. K. Jay, S. Vesselin and S. Donglu, Smart Materials and Structures, 2006, 15, 737.

I. M. Alarifi, A. Alharbi, W. Khan and R. Asmatulu, Journal of Applied Polymer Science, 2016, 133, 43235.

X. Wang, L. Dong, H. Zhang, R. Yu, C. Pan and Z. L. Wang, Advanced Science, 2015, 2, 1500169.

S. Ryu, P. Lee, J. B. Chou, R. Xu, R. Zhao, A. J. Hart and S.-G. Kim, ACS Nano, 2015, 9, 5929-5936.

J. J. Park, W. J. Hyun, S. C. Mun, Y. T. Park and O. O. Park, ACS Applied Materials & Interfaces, 2015, 7, 6317-6324.

M. Hempel, D. Nezich, J. Kong and M. Hofmann, Nano Letters, 2012, 12, 5714-5718.

A. A. Barlian, P. Woo-Tae, J. R. Mallon, A. J. Rastegar and B. L. Pruitt, Proceedings of the IEEE, 2009, 97, 513-552.

S. Mark, S. Yi, H. Adam and S. Vesselin, Sensor Review, 2014, 34, 209-219.

X. Li, R. Zhang, W. Yu, K. Wang, J. Wei, D. Wu, A. Cao, Z. Li, Y. Cheng, Q. Zheng, R. S. Ruoff and H. Zhu, Scientific Reports, 2012, 2, 870.

J. Lee, S. Kim, J. Lee, D. Yang, B. C. Park, S. Ryu and I. Park, Nanoscale, 2014, 6, 11932-11939.

S. Gong, D. T. H. Lai, Y. Wang, L. W. Yap, K. J. Si, Q. Shi, N. N. Jason, T. Sridhar, H. Uddin and W. Cheng, ACS Applied Materials & Interfaces, 2015, 7, 19700-19708.

M. Amjadi, A. Pichitpajongkit, S. Lee, S. Ryu and I. Park, ACS Nano, 2014, 8, 5154-5163.

B.-C. Zhang, H. Wang, Y. Zhao, F. Li, X.-M. Ou, B.-Q. Sun and X.-H. Zhang, Nanoscale, 2016, 8, 2123-2128.

E. Roh, B.-U. Hwang, D. Kim, B.-Y. Kim and N.-E. Lee, ACS Nano, 2015, 9, 6252-6261.

G. T. Pham, Y.-B. Park, Z. Liang, C. Zhang and B. Wang, Composites Part B: Engineering, 2008, 39, 209-216.

Y. Cheng, R. Wang, J. Sun and L. Gao, Advanced Materials, 2015, 27, 7365-7371.

C. S. Boland, U. Khan, C. Backes, A. O'Neill, J. McCauley, S. Duane, R. Shanker, Y. Liu, I. Jurewicz, A. B. Dalton and J. N. Coleman, ACS Nano, 2014, 8, 8819-8830.

J. Herrmann, K.-H. Müller, T. Reda, G. R. Baxter, B. Raguse, G. J. J. B. de Groot, R. Chai, M. Roberts and L. Wieczorek, Applied Physics Letters, 2007, 91, 183105.

X. Wang, Y. Qiu, W. Cao and P. Hu, Chemistry of Materials, 2015, 27, 6969-6975.

A. Greiner and J. H. Wendorff, Angewandte Chemie International Edition, 2007, 46, 5670-5703.

D. Li and Y. Xia, Advanced Materials, 2004, 16, 1151-1170.

L. Zhang, A. Aboagye, A. Kelkar, C. Lai and H. Fong, J Mater Sci, 2013, 49, 463-480.

X. Peng, W. Ye, Y. Ding, S. Jiang, M. Hanif, X. Liao and H. Hou, RSC Advances, 2014, 4, 42732-42736.

Z. Zhou, C. Lai, L. Zhang, Y. Qian, H. Hou, D. H. Reneker and H. Fong, Polymer, 2009, 50, 2999-3006.

Y. Liu, J. Huang, H. Hou and T. You, Electrochemistry Communications, 2008, 10, 1431-1434.

Lee, J., et al., Nanoscale, 2014. 6(20): p. 11932-11939.

Amjadi, M., et al., ACS Nano, 2014. 8(5): p. 5154-5163.

Gong, S., et al., ACS Applied Materials & Interfaces, 2015. 7(35): p. 19700-19708.

Zhang, B.-C., et al., Nanoscale, 2016. 8(4): p. 2123-2128.

Ryu, S., et al., ACS Nano, 2015. 9(6): p. 5929-5936.

Roh, E., et al., ACS Nano, 2015. 9(6): p. 6252-6261.

Darabi, M. A., et al., ACS Applied Materials & Interfaces, 2015. 7(47): p. 26195-26205.

Boland, C. S., et al., ACS Nano, 2014. 8(9): p. 8819-8830.

Park, J. J., et al., ACS Applied Materials & Interfaces, 2015. 7(11): p. 6317-6324.

Yan, C., et al., Advanced Materials, 2014. 26(13): p. 2022-2027.

What is claimed is:

1. A method for assembling a highly stretchable and sensitive strain sensor, comprising:
    forming a polyacrylonitrile (PAN) nanofibrous mat from electrospinning;
    producing a carbon nanofibers (CNFs) mat by stabilization and carbonization of the PAN nanofibrous mat, wherein the CNFs mat has opposing ends and a thickness of 60 µm, the step of producing the CNFs mat further comprising:
        heating the CNFs mat up to a temperature of 250° C. at a rate of 1° C/min in a first furnace;
        maintaining the 250° C. temperature for at least 3 hours while introducing an inert pas into the first furnace;
        heating the CNFs mat in a second furnace by increasing temperature to 600° C., 800° C., 1000° C., and 1200° C. at a rate of 5° C/min,
        maintaining the 600° C., 800° C., 1000° C., and 1200° C. temperature for at least 1 hour while introducing the inert gas into the second furnace;
    film casting a first polyurethane (PU) solution into a first PU film by coating a first layer of the PU film onto a curing substrate, wherein the first PU solution comprises a 15 wt % PU solution;
    assembling the CNFs mat on top of the first layer of the PU film and the curing substrate;
    preparing electrical contacts by applying an electrically conductive material to the opposing ends of the CNFs mat and connecting a first electrical conductor and a second electrical conductor to the electrically conductive material on the opposing ends of the CNFs mat;
    film casting a second polyurethane (PU) solution into a second PU film by coating a second layer of the second PU film on top of the CNFs mat, wherein the second PU solution comprises the 15 wt % PU solution; and
    encapsulating the first layer of the PU film, the CNFs mat, the electrically conductive material on the opposing ends of the CNFs mat, the first and second electrical conductor on the opposing ends of the CNFs by film casting the second layer of the second PU film on top of the first layer of the PU film, the CNFs mat, the electrically conductive material on the opposing ends of the CNFs mat, and electrical leads of the first and second electrical conductor on the opposing ends of the CNFs mat for forming the strain sensor.

2. The method of claim 1, further comprising:
    forming a 12 wt % PAN solution by dissolving PAN in a mixture solvent of N,N-dimethylmethanamide (DMF) and tetrahydrofuran (THF).

3. The method of claim 1, further comprising:
    drying the PAN nanofibrous mat prior to carbonization.

4. The method of claim 1, further comprising:
    oxidatively stabilizing the PAN nanofibrous mat prior to carbonization.

5. The method of claim 1, further comprising:
    exposing the PAN nanofibrous mat to an inert gas during carbonization.

6. The method of claim 1, further comprising:
    preparing at least a 15 wt % PU solution from a PU constituent dissolved in DMF.

7. The method claim 1, further comprising:
    detecting one or more human movements from placement of the strain sensor on one or more parts of the body.

8. The strain sensor of claim 7, wherein the PAN nanofibrous mat is formed from electrospinning a 12 wt % PAN solution of PAN, N,N-dimethylmethanamide (DMF) and tetrahydrofuran (THF).

9. The strain sensor of claim 7, wherein the PAN nanofibrous mat is dried prior to carbonization.

10. The strain sensor of claim 7, wherein the PAN nanofibrous mat is oxidatively stabilized prior to carbonization.

11. The strain sensor of claim 7, wherein the PAN nanofibrous mat is exposed to an inert gas during carbonization.

12. The strain sensor of claim 7, wherein the PU solution comprises a 15 wt % PU solution from a PU constituent dissolved in DMF.

13. The method of claim 1, wherein the PU film is in direct contact with the CNFs mat.

14. A highly stretchable and sensitive strain sensor, comprising:
    a polyacrylonitrile (PAN) nanofibrous mat formed by electrospinning;
    a carbon nanofibers (CNFs) mat formed by carbonization of the PAN nanofibrous mat, wherein the CNFs mat has opposing ends;
    a polyurethane (PU) solution film cast into a PU film;
    a first layer of the PU film coated onto a curing substrate, wherein the CNFs mat is assembled on top of the first layer of the PU film and the curing substrate;
    one or more electrical contacts comprising an electrically conductive material applied to the opposing ends of the CNFs mat;
    a first electrical conductor and a second electrical conductor connected to the electrically conductive material on the opposing ends of the CNFs mat; and
    a second layer of the PU film coated on top of the CNFs mat, wherein the first layer of the PU film, the CNFs mat, the electrically conductive material on the opposing ends of the CNFs mat, electrical leads of the first and second electrical conductor on the opposing ends of the CNFs are encapsulated by the second layer of the PU film applied directly on top of the first layer of the PU film, the CNFs mat, the electrically conductive material on the opposing ends of the CNFs mat, and the first and second electrical conductor on the opposing ends of the CNFs mat for forming the strain sensor.

15. A strain sensor device for measuring human motion, comprising:
   a polyacrylonitrile (PAN) nanofibrous mat formed by electrospinning;
   a carbon nanofibers (CNFs) mat formed of the PAN nanofibrous mat by a first oxidative stabilization treatment and a second carbonization treatment with a carbonization atmosphere having at least one inert gas;
   a polyurethane (PU) solution from PU granules dissolved and film cast into a PU film;
   a first layer of the PU film coated onto a curing substrate;
   a first assembly of the first layer of PU film and the CNFs mat comprising the CNFs mat applied directly on top of the PU film;
   one or more electrical contacts on opposing ends of the CNFs mat, wherein the one or more electrical contacts are applied directly to the CNFs mat; and
   a second layer of the PU film coated onto the curing substrate;
   a second assembly of the first layer of the PU film, the CNFs mat and the second layer of the PU film comprising the CNFs mat, the one or more electrical contacts encapsulated by the second layer of the PU film for forming the strain sensor device;
   at least one or more connection contacts on the first layer and/or the second layer of PU film, wherein the one or more connection contacts are configured to secure the strain sensor device to a portion of the human body for measuring human motion.

16. The strain sensor device of claim 15 disposed on a portion of the human body for measuring bending movement.

17. The strain sensor device of claim 15 disposed at the wrist for measuring bending.

18. The strain sensor device of claim 15 disposed at the elbow for measuring bending.

19. The strain sensor device of claim 15 disposed at the finger for measuring bending.

20. The strain sensor device of claim 15, wherein electrospun carbon nanofibers form a freestanding mat/film, and wherein the freestanding mat/film is readily tailored to the desired shape and size before integration into the strain sensor device.

* * * * *

UNITED STATES PATENT AND TRADEMARK OFFICE
CERTIFICATE OF CORRECTION

PATENT NO. : 10,883,814 B2
APPLICATION NO. : 16/300010
DATED : January 5, 2021
INVENTOR(S) : Zhengtao Zhu, Yichun Ding and Yongchen Yang Page 1 of 1

It is certified that error appears in the above-identified patent and that said Letters Patent is hereby corrected as shown below:

In the Claims

Column 11, Claim 1, Line 41 change "pas" to --gas--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*